(12) United States Patent
Cox et al.

(10) Patent No.: US 9,890,885 B2
(45) Date of Patent: Feb. 13, 2018

(54) COLLET CONNECTION SYSTEM FOR A SUBSEA STRUCTURE

(71) Applicant: TRENDSETTER ENGINEERING, INC., Houston, TX (US)

(72) Inventors: Brent Cox, Houston, TX (US); Jeffrey Partridge, Houston, TX (US)

(73) Assignee: TRENDSETTER ENGINEERING, INC., Houston, TX (US)

( * ) Notice: Subject to any disclaimer, the term of this patent is extended or adjusted under 35 U.S.C. 154(b) by 379 days.

(21) Appl. No.: 14/661,400

(22) Filed: Mar. 18, 2015

(65) Prior Publication Data

US 2016/0273694 A1    Sep. 22, 2016

(51) Int. Cl.
*F16L 37/091*    (2006.01)
*F16L 37/084*    (2006.01)

(52) U.S. Cl.
CPC ................ *F16L 37/0847* (2013.01)

(58) Field of Classification Search
CPC ....... E21B 33/038; E21B 34/04; E21B 43/013
See application file for complete search history.

(56) References Cited

U.S. PATENT DOCUMENTS

| | | | | |
|---|---|---|---|---|
| 3,321,217 | A | * | 5/1967 | Ahlstone ............... E21B 33/038 166/338 |
| 3,523,579 | A | | 8/1970 | Nelson |
| 4,477,105 | A | | 10/1984 | Wittman et al. |
| 4,526,406 | A | * | 7/1985 | Nelson ................. E21B 33/038 285/18 |
| 4,693,497 | A | | 9/1987 | Pettus et al. |
| 4,708,376 | A | | 11/1987 | Jennings et al. |
| 5,795,093 | A | * | 8/1998 | Seaton .................. F16B 21/065 166/338 |
| 6,234,252 | B1 | * | 5/2001 | Pallini, Jr. ............. E21B 33/038 166/345 |
| 6,267,419 | B1 | | 7/2001 | Baker et al. |
| 2001/0028150 | A1 | | 10/2001 | Fant |
| 2010/0078174 | A1 | | 4/2010 | Spiering et al. |

(Continued)

FOREIGN PATENT DOCUMENTS

GB       2467192 B    7/2010

OTHER PUBLICATIONS

International Search Report for International Application No. PCT/US16/39320.

*Primary Examiner* — James G Sayre
(74) *Attorney, Agent, or Firm* — Egbert Law Offices, PLLC

(57) ABSTRACT

A subsea connection system for connecting to a hub of a subsea structure has an outer sleeve, a collet having a plurality of collet segments in which the collet segments are movable between a lock position and an unlock position, a connection hub positioned in the interior of the hollow sleeve such that the collet extends around the connection hub, and a translation mechanism cooperative with the outer sleeve so as to move the outer sleeve between a forward position and a rearward position. The connection hub is suitable for abutting the hub of the subsea structure when the plurality of collet segments are in the lock position. The plurality of collet segments are in the unlock position when the outer sleeve is in the forward position. The plurality of collet segments are in the lock position when the outer sleeve is in the rearward position.

20 Claims, 5 Drawing Sheets

(56) References Cited

U.S. PATENT DOCUMENTS

| | | | |
|---|---|---|---|
| 2010/0186964 A1* | 7/2010 | Reid | E21B 41/04 |
| | | | 166/341 |
| 2010/0288503 A1* | 11/2010 | Cuiper | E21B 33/038 |
| | | | 166/341 |
| 2012/0318516 A1 | 12/2012 | Beynet et al. | |
| 2014/0361534 A1* | 12/2014 | Bekkevold | E21B 43/013 |
| | | | 285/315 |
| 2015/0114659 A1* | 4/2015 | Jahnke | E21B 33/038 |
| | | | 166/360 |

* cited by examiner

COLLET CONNECTION SYSTEM FOR A SUBSEA STRUCTURE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the connecting of external items to a subsea structure. More particularly, the present invention relates to collet-type connection systems. More particularly the present invention relates to the ability to connect hubs through the use of a collet system.

2. Description of Related Art Including Information Disclosed Under 37 CFR 1.97 and 37 CFR 1.98

Technology advances related to subsea petroleum exploration have resulted in the development of various conduit and wellhead connector mechanisms which may be remotely controlled for the purpose of achieving connection between mechanical and hydraulic apparatus of wellheads, conduits, and the like. A popular type of connector assembly is a hydraulically-actuated collet connector which utilizes a series of segment clamps which are biased by other mechanical apparatus to releasably secure a pair of abutting flanges into a sealed assembly. Collet connectors and other acceptable connector mechanisms are generally utilized for connection of the wellhead valve system with the production system of the wellhead so that the wellhead valve assembly may be disconnected and removed in the event that replacement or repair is necessary.

A multi-well subsea assembly can include subsea structures such a subsea trees, manifolds, and/or pipeline end terminations. These subsea structures can be interconnected by jumpers. The jumpers mate up with the subsea structures using connectors that mate with hubs on the subsea structures. Production is often routed from the trees in the gathering manifolds and from the gathering manifolds to pipeline end terminations and pipelines to the platform.

When dealing with subsea applications, it becomes necessary to simplify or eliminate the use of divers during the locking of a connector in order to secure the connection between the drilling or piping components in the wellhead. Hydraulically-actuated collet connectors have been developed and utilized for this purpose. These collet-type connectors are designed for high pressure in deepwater drilling operations. The collet connectors are secured over the mating sections of the drilling or piping components to be connected by use of hydraulic pressure. Because the hydraulic pressure can be controlled remotely, it is not necessary for divers to lock the collet connector in order to secure the connection.

There are several problems associated with existing collet connectors. First, and foremost, very skillful operators are required so as to bring the hub of a collet connector into a proper position with respect to the hub of the subsea structure. In certain circumstances, it is been known that the hubs can become damaged if the landing between the hubs is not carried out properly. Additionally, there is a possibility that the gasket between the hubs can become compromised if an improper engagement between the hubs is carried out. Additionally, in prior art collet connectors, the lead screw associated with the collet connectors is placed into the primary load path of the connection. As a result, additional force is required in order to achieve the proper connection. In prior art collet connector systems, it becomes difficult for the operators to properly view the connection while it is being carried out. Furthermore, prior art collet connector systems also have ineffective secondary removal capabilities. As such, a need has developed in association with collet connectors so as to allow the collet connector to be easily and properly installed with no possibility of damaging contact during the installation.

In the past, various patents and patent application publications have issued with respect to collet-type connectors. For example, U.S. Pat. No. 3,523,579, issued on Aug. 11, 1970 to N. A. Nelson, describes a wellhead valve assembly which includes a plurality of hydraulically-actuated valves and an appropriate hydraulic fluid supply system for actuation of the valves. A hydraulically-actuated collet connector is provided for connecting production flow conduits and hydraulic fluid supply conduits to the wellhead valve assembly. The collet connector includes a means for remotely detecting leakage of production fluid or hydraulic fluid in the event that the joint between the wellhead valve assembly and the hydraulic collet connector should fail to properly seal.

U.S. Pat. No. 4,477,105, issued on Oct. 16, 1984 to Wittman et al., teaches a collet-actuated ball-and-socket connector. This connector is for connecting the ends of two pipes. A ball coupling member is adapted for connection to the end of one of the pipes. A retaining flange is freely disposed about the ball coupling member and engages the outer surface of the member. A socket coupling member is adapted for connection to the end of the other of the two pipes and provided for accepting the ball coupling member so as to provide a metal sealing ring for mating with the ball members. A collet locking means is mounted about the outer periphery of the socket coupling member and extends generally axially therefrom for permitting insertion of the ball coupling member in mating engagement with the socket coupling member when the collet means is open. An actuating means applies a predetermined axial force to the collet locking means for closing the collet means to engage the retaining flange and lock the ball-and-socket coupling members together in a sealed rigid relationship.

U.S. Pat. No. 4,693,497, issued on Sep. 15, 1987 to Pettus et al., describes a remotely-actuated collet connector which is suitable for joining tubular members with similar or different end preparations or profiles. The collet connector includes a housing to support the connector from a first tubular member, a plurality of collet fingers or segments mounted within the housing and around the exterior of the first tubular member, and an actuator ring surrounding the fingers to move the fingers to a release or latch position, and a pressure responsive means for moving the actuator ring.

Each of the collet fingers has a first engaging surface and an adapter secured to the finger and also has a second engaging surface. The first engaging surface mates with the end profile of the first tubular member. The second engaging surface mates with the end profile of the second tubular member so that when the collet fingers are moved to the latch position they secure the first and second tubular members together.

U.S. Pat. No. 4,708,376, issued on Nov. 24, 1987 to Jennings et al., shows a collet-type connector having an upper body member having a plurality of collet segments, a cam ring movable relative to the upper body member to move the collet segments into a detachable connection with the connector of a subsea wellhead. The cam ring and the collet segments have sets of camming surfaces whereby a first set is cooperative to pivot the collet segments initially toward the wellhead and whereby a second set serves to urge the collet segments further to clamp the connector to the subsea wellhead. When the second set of camming surfaces function, the first set no longer functions to rotate the collet segments so as to reduce the power requirements for urging the collet segments into clamping engagement.

U.S. Pat. No. 6,267,419, issued on Jul. 31, 2001 to Baker et al., shows a remotely actuated clamping connector. The clamping connector includes clamp halves linked by a locking stem. The locking stem is forced into a pre-stressed state by moving the locking stem from a first relaxed position to a second pre-stressed position and retained in the second pre-stressed position by a locking collet. A locking collet through which the locking stem extends is moved from a first unlocked position to a second locked position wedged between the locking stem and one or the other of the clamp halves. When the locking collet is in the second locked position, it resists movement of the locking stem from the second pre-stressed position to the first relaxed position. The locking collet is then locked in the second locked position.

U.S. Patent Application Publication No. 2014/0361534, published on Dec. 11, 2014 to K. Bekkevold, describes a connector having a plurality of latching fingers arranged around a cylindrical body and having a central axis. Each finger has a first end region extending beyond an end of the body includes a first latching structure. Each finger is pivotally supported at an intermediate region by a portion of the body and is movable between a non-latching position and a latching position in which the first end region is closer to the central axis than in the non-latching position. The connector includes a first actuated member arranged in contact with a plurality of fingers and operable to move the fingers between the non-latching position and the latching position. An actuator is operable to force a second end region of each finger toward the body. The connector can be connected to a hub by bringing the connector face into contact with a hub face, moving the latching fingers toward the connector until the first latching structures are engaged in corresponding second latching structures on the hub, and then holding the latching structures together in a latching engagement.

It is an object of the present invention to provide a collet connection system that effectively prevents damage to the hubs and damage to the gasket that is arranged between the hubs.

It is another object the present invention provide a collet connection system that improves installation efficiency.

It is another object the present invention to provide a collet connection system that allows less skillful operators to carry out the connection.

It is another object of the present invention to provide a collet connection system in which the travel of the collet connector can be viewed externally.

It is another object of the present invention to provide a collet connection system that facilitates secondary removal capabilities.

It is a further object of the present invention to provide a collet connection system that takes the lead screw out of the primary load path.

It is another object of the present invention to provide a collet connection system that allows less torque to be used for the connection process.

It is still a further object of the present invention to provide a collet connection system that effectively preloads the hub to the hub connector.

These and other objects and advantages of the present invention will become apparent from a reading of the attached specification and appended claims.

BRIEF SUMMARY OF THE INVENTION

The present invention is a subsea connection system for connecting to a hub of a subsea structure. The connection system includes an outer sleeve having an inner wall and an interior, a collet having a plurality of collet segments in which the plurality of collet segments are movable between a lock position and an unlock position, a connection hub positioned in the interior of the outer sleeve such that the collet extends around the connection hub, and a translation mechanism cooperative with the outer sleeve so as to move the outer sleeve between a forward position and a rearward position. The connection hub is suitable for abutting the hub of the subsea structure when the plurality of collet segments are in the lock position. The plurality of collet segments are in the unlock position when the outer sleeve is in the forward position. The plurality of collet segments are in the locked position when the outer sleeve is in the rearward position. In the locked position, the connection hub will be configured in tight face-to-face relationship with the hub of the subsea structure.

The outer sleeve has a surface on an interior wall thereof that bears against an outer surface of the plurality of collet segments as the outer sleeve moves between the forward position and the rearward position. The surface on the inner wall of the outer sleeve has a first tapered region that bears against the outer surface of the plurality of collet segments when the plurality of collet segments are in the unlock position. The surface of the inner wall of the outer sleeve has a second tapered region that bears against the outer surface of the plurality of collet segments when the plurality of collet segments are in the lock position. Each of the plurality of collet segments has a rearward end and a forward end and an intermediate section therebetween. The first tapered region of the outer sleeve bears against the rearward end of the plurality of collet segments when the plurality of collet segments are in the unlocked position. The outer sleeve has in abutment surface formed on the inner wall thereof. This abutment surface slidably bears against the intermediate section of the collet segment as the outer sleeve moves from the forward position toward the rearward position. Each of the plurality of collet segments is pivotally mounted relative to the connection hub.

A body is positioned in the interior of the outer sleeve. The connection hub is positioned at a forward end of the body. The body has a fluid passageway formed therein so as to open at the connection hub. The outer sleeve is translatable relative to the body.

Each of the plurality of collet segments has a forward end. The collet segments have a shoulder formed in the interior surface at the forward end of the collet segments. The shoulder has a tapered surface adapted to engage with a shoulder of the hub of the subsea structure. This tapered surface is suitable for drawing the connection hub toward the hub of the subsea structure as the outer sleeve moves from the forward position to the rearward position. The outer sleeve includes a nose portion at the forward end of the outer sleeve. The nose portion is adapted to be inserted into a bucket surrounded the hub of the subsea structure.

The second tapered region is formed in the inner wall of the outer sleeve adjacent a forward end of the outer sleeve. The second tapered region bears against a forward end of the plurality of collet segments as the plurality of collet segments move to the lock position and as the outer sleeve moves to the rearward position. The outer sleeve has a shoulder formed on an exterior thereof. The shoulder is adapted to abut an end of a bucket surrounding the collet of the subsea structure when the outer sleeve is moved toward the hub of the subsea structure.

The translation mechanism is a screw mechanism that is coupled to the body and to the outer sleeve such that a rotation of the screw mechanism causes the outer sleeve to non-rotatably slide relative to the body. The screw mechanism has a stem extending outwardly therefrom. The stem is adapted to engage with a torque tool of a remotely-operated vehicle. A bucket is affixed to the screw mechanism such that the bucket surrounds the stem.

The outer sleeve has a slot formed through the wall of the outer sleeve. The slot has a length corresponding to a length of travel of the outer sleeve between the forward position and the rearward position. A position indicator is affixed to the body and extends into the slot. The position indicator has an end opposite the body that is visible externally of the outer sleeve.

The outer sleeve includes an external shoulder formed in a location corresponding to the translation mechanism. The outer sleeve also has a plurality of separable segments arranged over the translation mechanism. A ring extends around the external sleeve and over the plurality of separable segments. The ring has an external shoulder formed thereon. As such, a removal mechanism can be positioned between the external shoulder of the outer sleeve and the external shoulder of the ring so as to apply a force so as to separate the ring from the outer sleeve and to allow the separable components to be released therefrom such that the collet can be moved to the unlock position.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
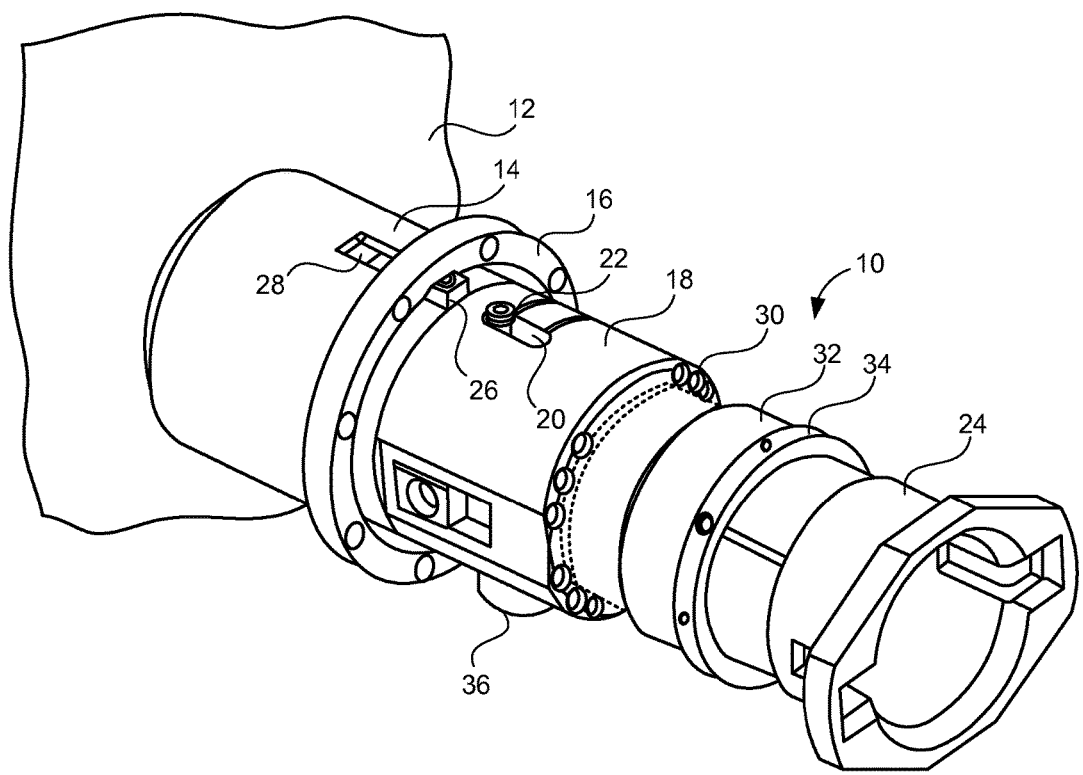
FIG. 1 is a perspective view of the collet connection system of the present invention as joined to the hub of a subsea structure.

Referring to FIG. 1, there is shown the collet connection system 10 in accordance with the present invention. The collet connection system 10 is for use in association with a subsea structure 12. The subsea structure can have a variety of configurations. In particular, the subsea structure 12 can include blowout preventers, production trees, weld heads, capping stacks, manifolds, and similar items. Within the concept of the present invention, the collet connection system 10 is particularly configured so as to join one hub to another hub in a locked and sealed configuration.

The hub associated with the subsea structure 12 will be located within a bucket 14. The bucket 14 is affixed to the subsea structure 12 so as to generally surround the hub of the subsea structure. The bucket 14 includes a flange 16 at an end thereof.

The collet connection system 10 of the present invention includes an outer sleeve 18. As will be described hereinafter, the outer sleeve 18 includes a small shoulder which is suitable for abutting the flange 16 of the bucket 14. As such, the travel of the outer sleeve 18 will be restricted by the flange 16. The sleeve 18 includes a slot 20 formed therein. A position indicator 22 is illustrated as extending outwardly of the slot 20. The position indicator 22 is intended to provide the user or operator with an indication of when the collet connection system 10 is in the locked position or the unlocked position. In particular, the position indicator 22, in combination with the slot 20, will be related to the length of travel of the outer sleeve between the forward position and the rearward position.

The collet connection system 10 of the present invention also includes a bucket 24 located at the end thereof opposite the outer sleeve 18. The bucket 24 will, as will be described hereinafter, surround a stem extending outwardly of a translation mechanism located within the interior of the collet connection system 10.

In FIG. 1, the outer sleeve 18 can include an anti-rotation element 26. The anti-rotation element 26 serves as a key for engaging with a slot 26 formed in the bucket 14. As such, when the nose portion of the outer sleeve 18 is inserted into the interior of the bucket 14, the anti-rotation element 26 will enter the slot 28. Slot 28 serves to prevent rotation of the outer sleeve. Within the concept of the present invention, the outer sleeve 28 will non-rotatably slide relative to a body located within the interior of the outer sleeve 18.

A shoulder 30 is formed on the outer sleeve 18. A ring 32 will extend around the exterior of the outer sleeve 18. Ring 32 also includes a shoulder 34 extending outwardly therefrom. As will be described hereinafter, if the mechanism associated with the subsea connection system 10 should fail, then a secondary release mechanism is provided whereby a tool can be placed around and over the ring 32 so as to have ends bearing against shoulders 30 and 34. As a result, components located within the outer sleeve 18 can be released so that a suitable force can be applied so as to release the subsea connection system 10 from the hub within the bucket 14.

FIG. 1 further shows that there is a fluid line 36 which extends into a body located on the interior of the sleeve 18. The fluid connection 36 is a fluid passageway which allows fluids to be introduced through the respective joined hubs and delivered to the subsea structure 12 or can be utilized so as to remove fluids from the subsea structure 12.

Figure 2:
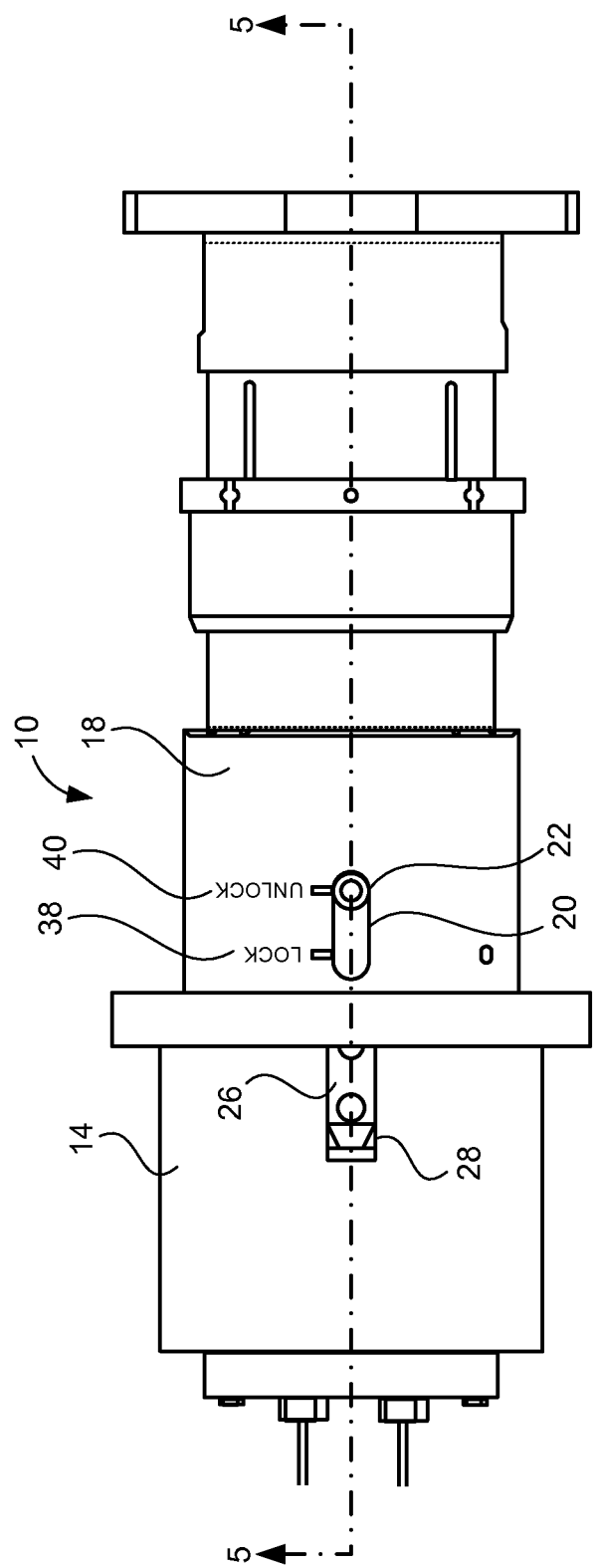
FIG. 2 is plan view of the collet connection system of the present invention as joined to a subsea structure.

FIG. 2 is a plan view of the subsea connection system 10 of the present invention. In particular, in FIG. 2, it can be seen that the outer sleeve 18 has the slot 20 formed thereon. The position indicator 22 is translatable within the slot 20 between the lock position 38 and the unlock position 40. As shown in FIG. 2, the position indicator 22 is in the unlock position. As such, the collet segments located within the interior of the bucket 14 and within the interior of the outer sleeve 18 are not joined to the hub of the subsea structure 12. FIG. 2 also shows the slot 28 which receives the anti-rotation element 26. The anti-rotation element 26 is freely movable within the slot.

Figure 3:
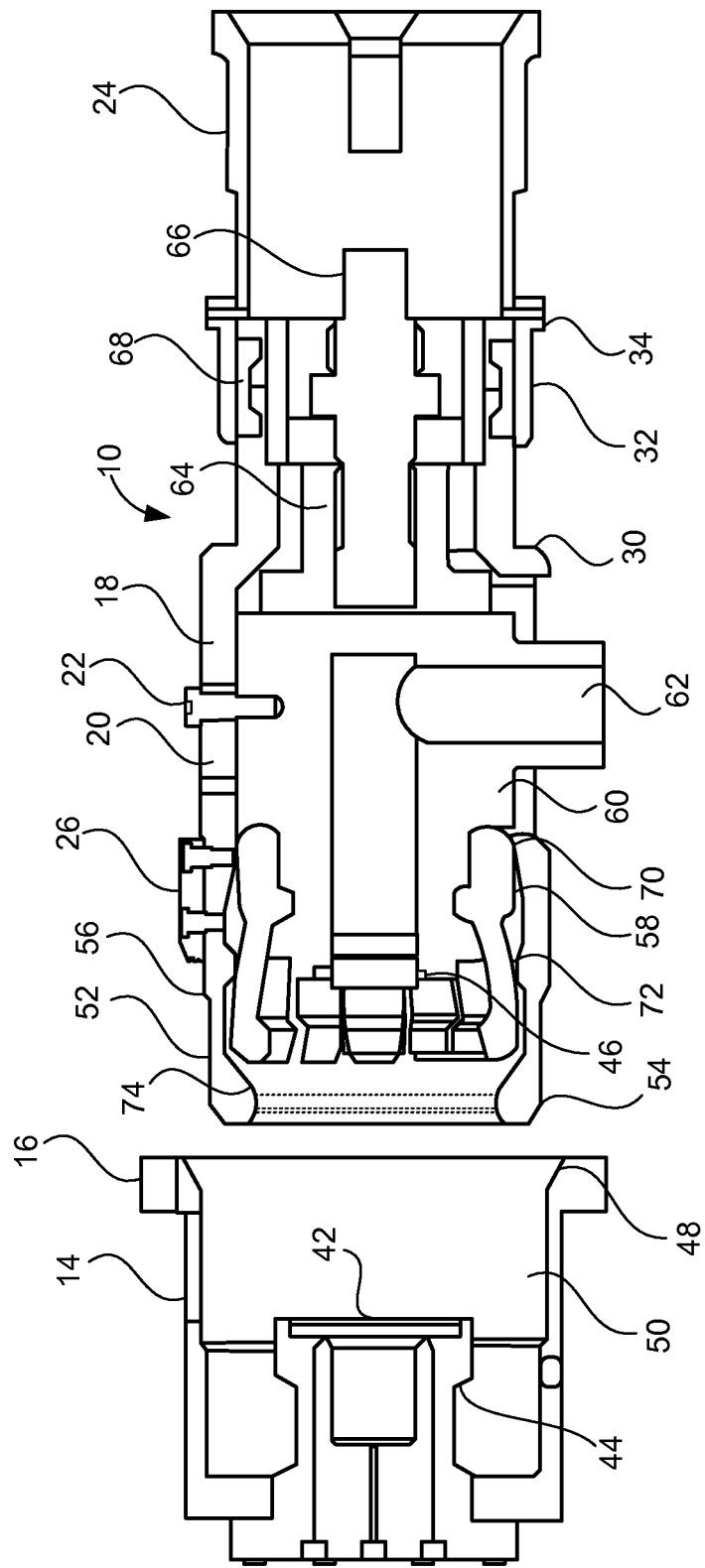
FIG. 3 is a cross-sectional view of the collet connection system of the present invention as shown in the position prior to installation.

FIG. 3 shows the subsea connection system 10 in a position prior to installation upon the hub 42 of the subsea structure. The hub 42 is located within the interior of the bucket 14. The hub 42 also includes a shoulder 44 thereon. Shoulder 44 has a small angle of taper (approximately 10°). The mechanism of the present invention utilizes this angle of taper of the shoulder 44 so as to facilitate the connection between the hub 42 of the subsea structure and the connection hub 46. The bucket 14 is illustrated as having flange 16 located at a distance away from the hub 42. The flange 16 extends around a small taper 48 which narrows toward the interior 50 of the bucket 14. The angle of tapered portion 48 facilitates the ability to funnel the nose portion 52 of the outer sleeve 18 into the interior of the bucket 14 in a guided manner.

The nose portion 52 of the outer sleeve 18 also includes a tapered area 54. Tapered area 54 will be guided by the tapered portion 48 of the bucket 14 so as to be diverted in a controlled manner toward the hub 42. The nose portion 52 of the outer sleeve 18 also includes a shoulder 56 formed on an exterior surface thereof. The shoulder 56 will abut with the flange 16 of the bucket 14 so as to limit the amount of travel of the outer sleeve 18 within the interior 50 of the bucket 14. A collet 58 is positioned within the interior of the outer sleeve 18. Collet 58 includes a plurality of collet segments. The collet 58 is arranged around the connection hub 46. The connection hub 46 will have a configuration that suitable for abutting the hub 42 of the subsea structure or abutting a gasket positioned on the hub 42. The connection hub 46 is formed on a body 60 also located within the interior of the outer sleeve 18. Fluid passageway 62 is formed within the body 60 so as to lead from the fluid inlet 36 to an outlet at the connection hub 46. The collet segments associated with collet 58 are pivotally mounted relative to the body 60 within the interior of the outer sleeve 18.

A translation mechanism 64 is coupled to the body 60 and coupled to the outer sleeve 18 such that a rotation of translation mechanism 64 will cause a non-rotatable sliding of the outer sleeve 18. In FIG. 3, the outer sleeve 18 is illustrated in a forward position. The translation mechanism 64 is configured so as to move the outer sleeve 18 from the forward position (illustrated in FIG. 3) to a rearward position (illustrated in FIG. 5). The translation mechanism 64 is actually a screw mechanism that has a stem 66 extending outwardly therefrom. Stem 66 is illustrated as located within the bucket 24. As such, the bucket 24 allows a torque tool of an ROV to the to be inserted into the bucket 24 and engaged with the stem 66. As a result, the torque tool of an ROV can suitably rotate the translation mechanism 64 so as to allow the outer sleeve 18 to move from its forward position to its rearward position.

As can be seen in FIG. 3, there are there are a plurality of separable segments 68 arranged over the translation mechanism 64. The ring 32 extends over these separable segments 68. As such, if the need would occur, a suitable tool can be placed between the shoulder 30 of the outer sleeve 18 and the shoulder 34 of ring 32 so as to urge the ring 32 in a direction along the exterior of the bucket 24. When the ring 32 is removed from over the separable segments 68, the separable segments 68 are easily released therefrom so as to allow the outer sleeve 18 to move to its forward position such that the collet 58 effectively releases any engagement with the shoulder 44 of the hub 42.

The inner wall of the outer sleeve 18 includes a first tapered region 70 that urges against an outer surface of the collet 58. This tapered region 70 maintains the collet segments of collet 50 in the open position (as illustrated in FIG. 3). The inner wall of the outer sleeve 18 also includes an abutment member 72 and a second tapered region 74. The abutment surface 72, along with the tapered regions 70 and 74, facilitate the ability to move the collet 58 from its unlock position to its lock position. Fundamentally, when the outer sleeve 18 is moved to its forward position, the first tapered region 70 will bear against the rearward end of the collet 58 so as to urge the collet 58 into the open position.

FIG. 3 also shows the position indicator 22 that is slidably positioned within the slot 20. The position indicator 22 has a surface that extends outwardly of the outer surface of the outer sleeve 18 that can be visible from the exterior of the subsea connection system 10. The position indicator 22 is illustrated in the unlocked position. The position indicator 22 is threadedly affixed to the body 60. Additionally, the anti-rotation element 26 is illustrated as affixed to the outer sleeve 18. As such, as the outer sleeve 18 moves from its forward position (illustrated in FIG. 3) to a rearward position, the position indicator 22 will maintain a fixed position while the outer sleeve 18 moves rearwardly.

Figure 4:
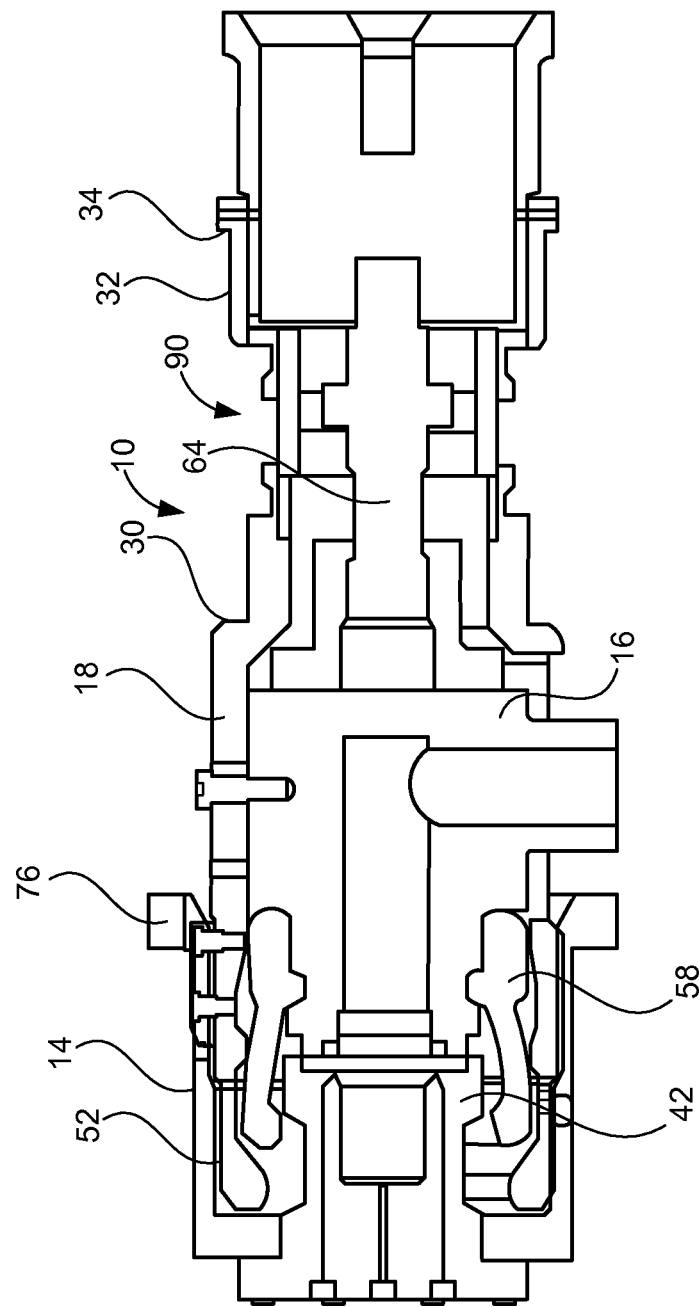
FIG. 4 is a cross-sectional view of the collet connection system of the present invention as shown in an intermediate step during the installation process.

FIG. 4 shows that the nose portion 52 of the outer sleeve 18 has been received within the interior of the bucket 14. The flange 16 of the bucket 14 bears against the shoulder 56 on the outer sleeve 18. As such, this relationship will stop the movement of the nose portion 52 of the outer sleeve prior to any contact between the hub 42 of the subsea structure and the hub 46 of the body 16. In FIG. 4, it can be seen that these hubs are arranged in close proximity to each other but are not yet joined together.

In this configuration, the translation mechanism 64 can be utilized so as to move the outer sleeve 18 rearwardly so as to allow the collets 58 to move toward the shoulder 44 of the hub 42.

Importantly, unlike prior collet-type connection apparatus, the present invention assures that the hub 46 on the interior of the outer sleeve 18 will not contact the hub 42 or the gasket associated with the hub 42. There will be a small distance between these hubs. As such, since the nose portion 52 of the outer sleeve 18 cannot penetrate any deeper into the bucket 14, it is not possible for damaging contact to occur between the hubs. An operator is not required to precisely and slowly move the hubs toward one another. The operator can move the subsea connection system 10 as fast as they desire in order to allow the nose portion 52 to enter the bucket 14. Skillful movement or personnel are not required in order to carry out this task. Ultimately, the only precise movement that is required is to cause the anti-rotation element 26 to enter the slot in the bucket 14.

Figure 5:
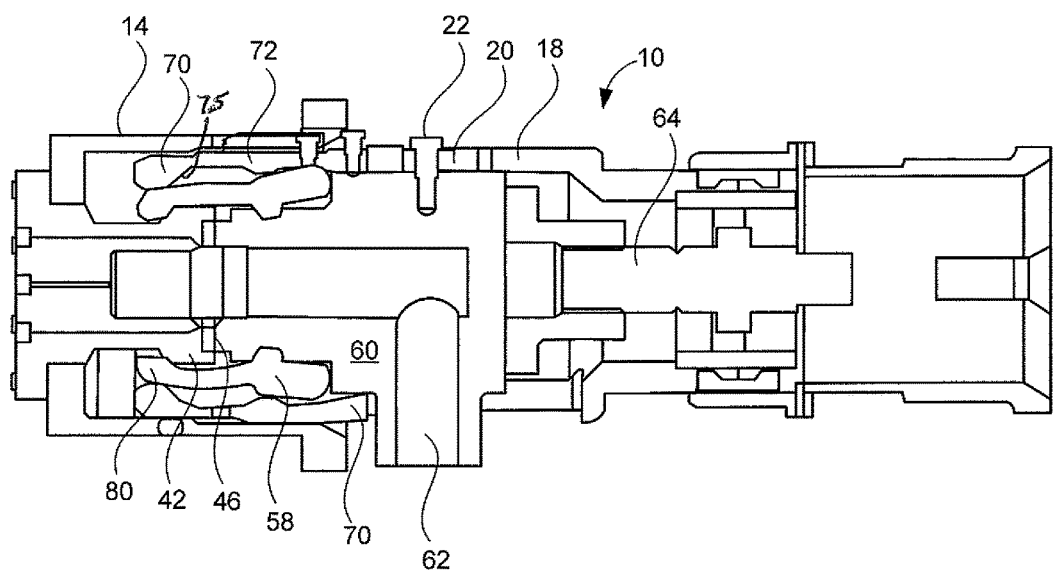
FIG. 5 is a cross-sectional view, as taken across lines 5-5 of FIG. 2, showing the completed connection of the collet connection system of the present invention.

FIG. 5 illustrates the configuration of the subsea connection system 10 when the translation mechanism 64 has moved the outer sleeve 18 to its rearward position. As can be seen, the third tapered region 75 is moved backwardly so as to urge against the forward end 80 of the segments of the collet 58. This arrangement causes the tapered inner shoulder of the collet segment to bear against the tapered shoulder of the hub 42. As a result, connection hub 46 will be drawn toward and joined to the hub 42 of the subsea structure. This will lock the hubs 42 and 46 together. The first tapered region 70 on the inner wall of the outer sleeve 18 will be separated from the rearward end of the collet 58. As such, this will release the rearward end of the collet 58 from its open position. The abutment member 72 located on the inner wall of the outer sleeve 18 can travel along the outer surface of the collet 58 so as to urge, in cooperation with the second tapered region 74, the movement of the collet 58 from the unlock position to the lock position. The fluid passageway 62 in the body 60 is now joined to the fluid passageway associated with the hub 42 of the subsea structure. This system effectively locks the hubs together. The position indicator 22 has now been moved to a forward portion of the slot 20 so that the lock position of the collets with the hub 42 can be clearly shown exterior of the collet connection system 10.

It should be noted that the second tapered region 74 of the outer sleeve 18 will move along a tapered forward end of the collet 58. This provides a guided movement of the forward end 80 of the collet 58 toward the shoulder 44 of the collet 42. This guidance assures that a proper connection can be achieved.

When it is desired to remove the subsea connection system 10 from the hub 42, it is only necessary to apply a reverse motion to the translation mechanism 64. As a result, the outer sleeve 18 will move forwardly to the position shown in FIGS. 3 and 4 such that the rigid connection between the collet 58 and the hub 42 is released. The subsea connection system 10 can then be simply pulled outwardly of the bucket 14 so as to separate this connection.

In the event that the translation mechanism 64 would not work properly or in the event that there were other problems associated with the subsea connection system, a secondary release system is provided. This is shown more particularly in FIG. 4. It can be seen that the separable segments 68 have been released from an area 90 over the translation mechanism 64. In other words, a suitable tool has been applied such that a force can be placed between the shoulders 30 of the outer sleeve 18 and the shoulder 34 of the ring 32. As such, the ring 32 moves from its position over the separable segments 68. The separable segments 68 are released. As a result, the outer sleeve 18 will automatically move forwardly within the bucket 14 so as to release the collet 58 from its engagement with the hub 42. In other words, the force applied by the tool which moves the ring 32 from its position over the separable segment 68 will also move the outer sleeve 18 forwardly. There is a reaction force between the shoulders 30 and 34 which causes this movement. Since the separable segments 68 cause the rotation of the screw 64 to cause a non-rotatable sliding motion of the outer sleeve 18, there is no restriction to the movement of the outer sleeve 52 forwardly.

Importantly, the present invention effectively prevents any damage from occurring to the hubs or to the gasket between the hubs. The present invention is inherently safe since no contact is achieved between the hubs during the initial installation of the outer sleeve into the bucket. It is only after the outer sleeve has been installed within the bucket that movement of the collets is enabled. This improves installation efficiency and reduces the requirements for the skill of the operator. The present invention facilitates the ability to view whether a locking action has actually occurred through the use of the position indicator. The present invention has secondary removal capability therein as a result of the use of the separable segments that are surrounded by the ring.

Importantly, the present invention takes the lead screw of the translation mechanism 64 out of the primary load path. It is in an indirect load path. As such, the strong torque forces that would be required because the screw mechanism is in the load path would not be required in the present invention. As such, less torque will be required of the torque tool of the ROV. The present invention effectively preloads the hub of the subsea structure to the connection hub. As such, the present invention assures a safe, easy and effective connection between the hubs in the subsea environment.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A subsea connection system for connecting to a hub of a subsea structure, the connection system comprising:
    an outer sleeve having an inner wall and an interior and an end;
    a collet having a plurality of collet segments in which said plurality of collet segments are movable between a lock position and an unlock position, the lock position adapted to engage the hub of the subsea structure, the unlocked position adapted to release the hub of the subsea structure;
    a connection hub positioned in said interior of said outer sleeve, said collet extending around said connection hub, said connection hub adapted to abut the hub of said subsea structure when said plurality of collet segments are in said lock position; and
    a translation mechanism cooperative with said outer sleeve so as to move said outer sleeve between an outward forward position and an inward rearward position, said plurality of collet segments being in said unlock position when said outer sleeve is in said outward forward position, said plurality of collet segments being in said lock position when said outer sleeve is in said inward rearward position, said end of said outer sleeve extending beyond an end of said collet when said outer sleeve in and said outward forward position.

2. The subsea connection system of claim 1, said outer sleeve having a surface on said interior wall thereof that bears against an outer surface of said plurality of collet segments as said outer sleeve moves between said outward forward position and said inward rearward position.

3. The subsea connection system of claim 2, said surface on said interior wall of said outer sleeve having a first tapered region that bears against the outer surface of said plurality of collet segments when said plurality of collet segments are in the unlock position, said surface of said interior wall of said outer sleeve having a second tapered region that bears against said outer surface of said plurality of collet segments when said plurality of collet segments are in the lock position.

4. The subsea connection system of claim 3, each of said plurality of collet segments having a rearward end and a forward end and an intermediate section between said rearward end and said forward end, said first tapered region of said outer sleeve bearing against said rearward end of said plurality of collet segments when said plurality of collet segments are in the unlock position, said outer sleeve having an abutment surface formed in said inner wall thereof, said abutment surface slidably bearing against said intermediate section as said outer sleeve moves from the outward forward position toward the inward rearward position.

5. The subsea connection system of claim 3, each of said plurality of collet segments having a rearward end and a forward end, said second tapered region formed in said inner wall of said outer sleeve adjacent to a forward end of said outer sleeve, said second tapered region bearing against a forward end of said plurality of collet segments as said plurality of collet segments move to the lock position and said outer sleeve moves to the inward rearward position.

6. The subsea connection system of claim 1, said plurality of collet segments of said collet being pivotally mounted relative to said hub.

7. The subsea connection system of claim 1, further comprising:
a body positioned in said interior of said outer sleeve, said connection hub positioned at a forward end of said body, said body having a fluid passageway formed therein so as to open at said hub, said outer sleeve being translatable relative to said body.

8. The subsea connection system of claim 7, said translation mechanism being a screw mechanism that is coupled to said body and to said outer sleeve such that a rotation of said screw mechanism causes said outer sleeve to non-rotatably slide relative to said body.

9. The subsea connection system of claim 8, said screw mechanism having a stem extending outwardly therefrom, said stem adapted to engage with a torque tool of a remotely operated vehicle.

10. The subsea connection system of claim 9, further comprising:
a bucket affixed to said screw mechanism such that said bucket surrounds said stem.

11. The subsea connection system of claim 7, said outer sleeve having a slot formed through the wall of said outer sleeve, said slot having a length corresponding to a length of travel of said outer sleeve between said forward position and said rearward position, the subsea connection system further comprising:
a position indicator affixed to said body and extending into said slot, said position indicator having an end opposite said body that is visible externally of said outer sleeve.

12. The subsea connection system of claim 1, each of said plurality of collet segments having a forward end, each of said plurality of said collet segments having a shoulder formed in an interior surface thereof, said shoulder having a tapered surface adapted to engage with a shoulder of the hub of the subsea structure, said tapered surface suitable for drawing said connection hub toward said hub of said subsea structure as said outer sleeve moves from the outward forward position to the inward rearward position.

13. The subsea connection system of claim 1, said outer sleeve having a nose portion at a said end of said outer sleeve, said nose portion adapted to be inserted into a bucket surrounding the hub of the subsea structure.

14. The subsea connection system of claim 1, said outer sleeve having a shoulder formed on an exterior thereof, said shoulder adapted to abut an end of a bucket surrounding the collet of the subsea structure when said outer sleeve is moved toward the hub of the subsea structure.

15. A subsea connection system for connecting to a hub of a subsea structure, the connection system comprising:
an outer sleeve having an inner wall and an interior and an end;
a collet having a plurality of collet segments in which said plurality of collet segments are movable between a lock position and an unlock position, the lock position adapted to engage the hub of the subsea structure, the unlocked position adapted to release the hub of the subsea structure;
a connection hub positioned in said interior of said outer sleeve, said collet extending around said connection hub, said connection hub adapted to abut the hub of said subsea structure when said plurality of collet segments are in said lock position; and
a translation mechanism cooperative with said outer sleeve so as to move said outer sleeve between an outward forward position and an inward rearward position, said plurality of collet segments being in said unlock position when said outer sleeve is in said outward forward position, said plurality of collet segments being in said lock position when said outer sleeve is in said inward rearward position, said outer sleeve having an external shoulder formed in a location corresponding to said translation mechanism, said outer sleeve having a plurality of separable segments arranged over said translation mechanism; and
a ring extending around said external sleeve and over said plurality of separable segments, said ring having an external shoulder formed thereon.

16. A subsea connection system comprising:
a subsea structure having a hub extending outwardly therefrom, said hub having a shoulder formed thereon, said subsea structure having a surface formed outwardly away from said hub and extending around said hub;
an outer sleeve having an inner wall and an interior, said outer sleeve having an external shoulder extending outwardly thereof;
a collet having a plurality of collet segments in which said plurality of collet segments are movable between a lock position and an unlock position;
a connection hub positioned in said interior of said outer sleeve, said collet extending around said connection hub, said connection hub abutting said hub of said subsea structure when said plurality of collet segments are in said lock position; and
a translation mechanism cooperative with said outer sleeve so as to move said outer sleeve between an outward forward position and an inward rearward position, said plurality of collet segments being in the unlock position when said outer sleeve is in said outward forward position, said plurality of collet segments being in said lock position when said outer sleeve is in said inward rearward position, said plurality of collet segments engaging with a shoulder of said hub of said subsea structure when in said lock position, said external shoulder of said sleeve bearing against said surface of said subsea structure as said collet moves from said unlock position to said lock position.

17. The subsea connection system of claim 16, said outer sleeve having a surface on said interior wall thereof that bears against an outer surface of said plurality of collet segments and said outer sleeve moves between said outward forward position and said inward rearward position.

18. The subsea connection system of claim 17, said plurality of collet segments tightly engaging with said shoulder of said hub of said subsea structure when said outer sleeve is in said inward rearward position.

19. The subsea connection system of claim 16, said subsea structure having a bucket thereon so as to surround said hub, said surface being an outward end of said bucket said external shoulder abutting said outward end of said bucket when a forward end of said outer sleeve is inserted into said bucket, said hub of said subsea structure being separable from said connection hub when said external shoulder abuts said end of said bucket and when said outer sleeve is in said forward position.

20. The subsea connection system of claim 16, further comprising:
   a body positioned in said interior of said outer sleeve, said connection hub positioned at a forward end of said body, said body having a fluid passageway formed therein so as to open at said connection hub, said outer sleeve being translatable relative to said body.

* * * * *